US008454425B2

(12) United States Patent
Schofield

(10) Patent No.: US 8,454,425 B2
(45) Date of Patent: Jun. 4, 2013

(54) GAMING SYSTEM AND METHOD OF GAMING

(75) Inventor: Amanda Jane Schofield, St. Kilda (AU)

(73) Assignee: Aristocrat Technologies Australia Pty Limited (AU)

( * ) Notice: Subject to any disclaimer, the term of this patent is extended or adjusted under 35 U.S.C. 154(b) by 48 days.

(21) Appl. No.: 12/876,809

(22) Filed: Sep. 7, 2010

(65) Prior Publication Data

US 2011/0136563 A1 Jun. 9, 2011

(30) Foreign Application Priority Data

Sep. 8, 2009 (AU) ................................ 2009904334

(51) Int. Cl.
*A63F 13/00* (2006.01)

(52) U.S. Cl.
USPC ............................................... 463/20; 463/31

(58) Field of Classification Search
USPC ........................ 463/20, 21, 22, 23, 25, 29, 31
See application file for complete search history.

(56) References Cited

U.S. PATENT DOCUMENTS

| | | | | |
|---|---|---|---|---|
| 4,510,934 | A | 4/1985 | Batra | |
| 6,004,207 | A | 12/1999 | Wilson et al. | |
| 2004/0162134 | A1 | 8/2004 | Walker et al. | |
| 2006/0183530 | A1 * | 8/2006 | Ellis | 463/16 |
| 2006/0246979 | A1 | 11/2006 | Chim et al. | |
| 2006/0281525 | A1 * | 12/2006 | Borissov | 463/20 |
| 2008/0064487 | A1 | 3/2008 | Stevens et al. | |
| 2008/0076518 | A1 | 3/2008 | Yoshizawa | |
| 2010/0029369 | A1 * | 2/2010 | Pacey | 463/20 |
| 2010/0124969 | A1 * | 5/2010 | Hughes et al. | 463/20 |

* cited by examiner

*Primary Examiner* — James S McClellan
(74) *Attorney, Agent, or Firm* — McAndrews, Held & Malloy, Ltd.

(57) ABSTRACT

A gaming machine is provided that provides games in which a plurality of symbols are selected from a group of symbols and displayed on a display and, if a winning combination occurs, the gaming machine awards an award. The gaming machine comprises a user interface in communication with a game controller. The game controller is configured to provide a first game in which an event counter is maintained by the game controller and modified by the game controller each time a counter event occurs, and to provide a second game in which the game controller modifies the group of symbols to include a number of specific symbols. The number of specific symbols is dependent on the value of the event counter.

27 Claims, 4 Drawing Sheets

GAMING SYSTEM AND METHOD OF GAMING

RELATED APPLICATIONS

This application claims priority to Australian Application No. 2009904334, filed Sep. 8, 2009, which is incorporated herein by reference in its entirety.

BACKGROUND OF THE INVENTION

The present invention generally relates to gaming machines and methods of gaming.

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

BRIEF SUMMARY OF THE INVENTION

In one aspect the present invention provides a gaming machine that provides games in which a plurality of symbols are selected from a group of symbols and displayed on a display and, if a winning combination occurs, the gaming machine awards an award, the gaming machine comprising a user interface in communication with a game controller, the game controller being configured to: provide a first game in which an event counter is maintained by the game controller and modified by the game controller each time a counter event occurs; provide a second game in which the game controller modifies the group of symbols to include a number of specific symbols, the number of specific symbols dependent on the value of the event counter.

In a second aspect the present invention provides a method for use with a gaming machine that is arranged to provide games in which symbols from a group of symbols are selected and displayed on a display, and to award an award if a winning outcome occurs, the method comprising: providing a first game in which an event counter is maintained and modified each time a counter event occurs; providing a second game in which the group of symbols is modified to include a number of specific symbols, the number of specific symbols dependent on the value of the event counter.

The counter event may be an increment event resulting in the event counter being modified by being incremented, or the counter event may be a decrement event resulting in the event counter being modified by being decremented.

The group of symbols may be modified by adding the number of specific symbols to the group of symbols. The group of symbols may, alternatively, be modified by replacing existing symbols in the group of symbols with the number of specific symbols.

During the first game the game a second event counter may be maintained and modified each time a second counter event occurs. In the second game the group of symbols may be modified to include a number of second specific symbols, the number of second specific symbols equal to the value of the second event counter.

The counter event may be selected from a group including:

the display of a particular symbol on the display;

the display of a particular symbol in a particular position on the display;

the display of a plurality of particular symbols on the display; or the display of a plurality of particular symbols in particular positions on the display.

Different counter events may result in the event counter being modified by a different value.

During the second game each specific symbol may be displayed on the display.

During the second game each specific symbol may displayed on the display in a pre-determined position.

The first game may be activated by a first game activation event.

The second game may be activated by a second game activation event.

The first game may deactivated by a first game deactivation event.

The second game may be deactivated by a second game deactivation event

In a third aspect, the invention broadly resides in instructions executable by a game controller to implement the method as described in the immediately preceding paragraphs and to such instructions when stored in a storage medium readable by the game controller.

In a fourth aspect the present invention relates to a data signal carrying instructions and/or data executable to implement the method described above.

Further aspects of the present invention will be apparent from the following description, given by way of example and with reference to the accompanying drawings. Also, various embodiments of the aspects described in the preceding paragraphs will be apparent from the appended claims, the following description and/or the accompanying drawings.

DETAILED DESCRIPTION OF THE INVENTION

Figure 1:
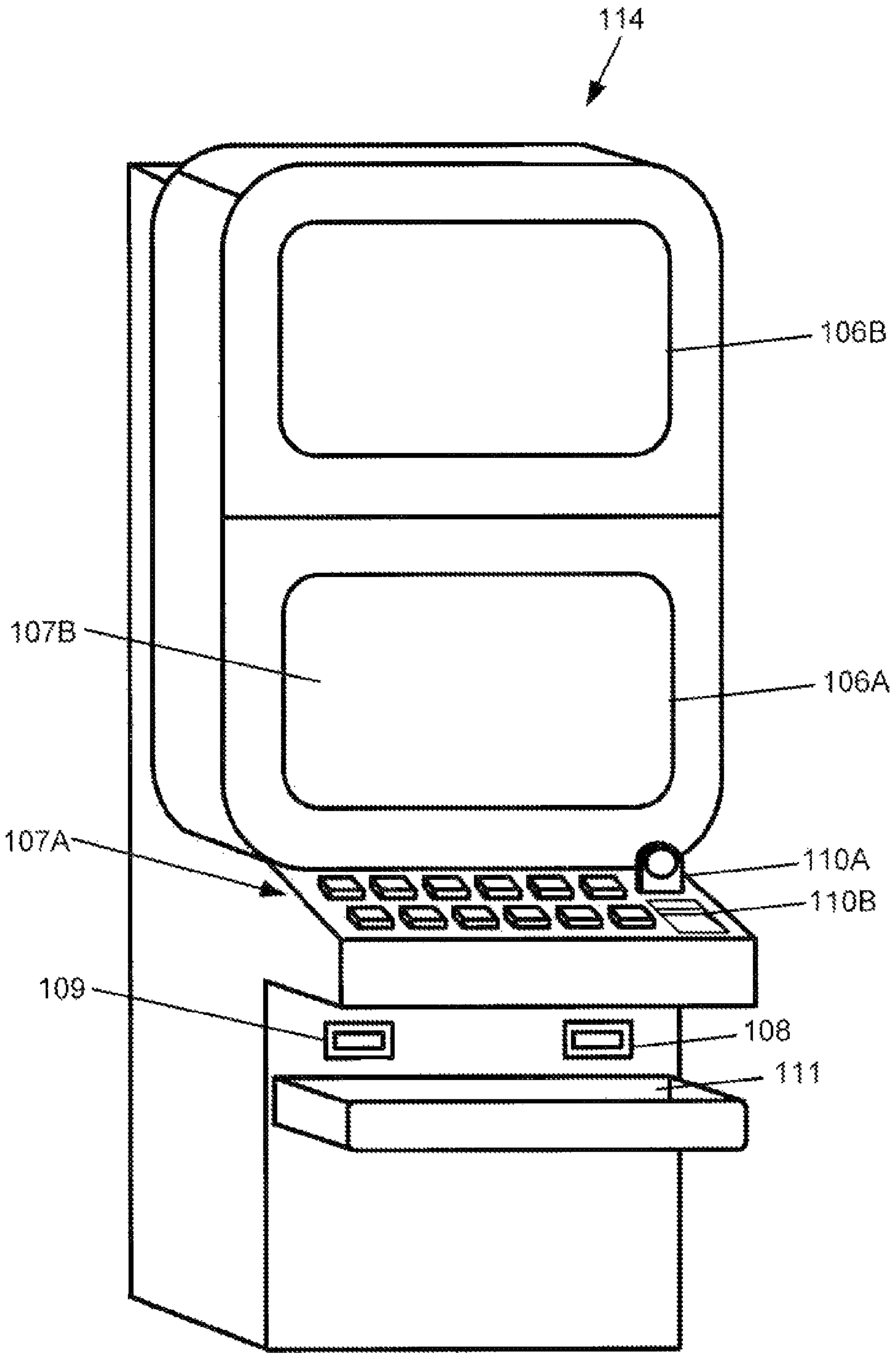
FIG. 1 shows diagrammatically, a view of a gaming console suitable for implementing the present invention.

In FIG. 1 of the accompanying drawings, one example of a gaming console that is suitable to implement the present invention is generally referenced by arrow 114.

The gaming console 114 includes two displays 106A, 106B on one or both of which is displayed representations of a game that can be played by a player and a bank of buttons 107A and/or a touch screen 107B to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 110B allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
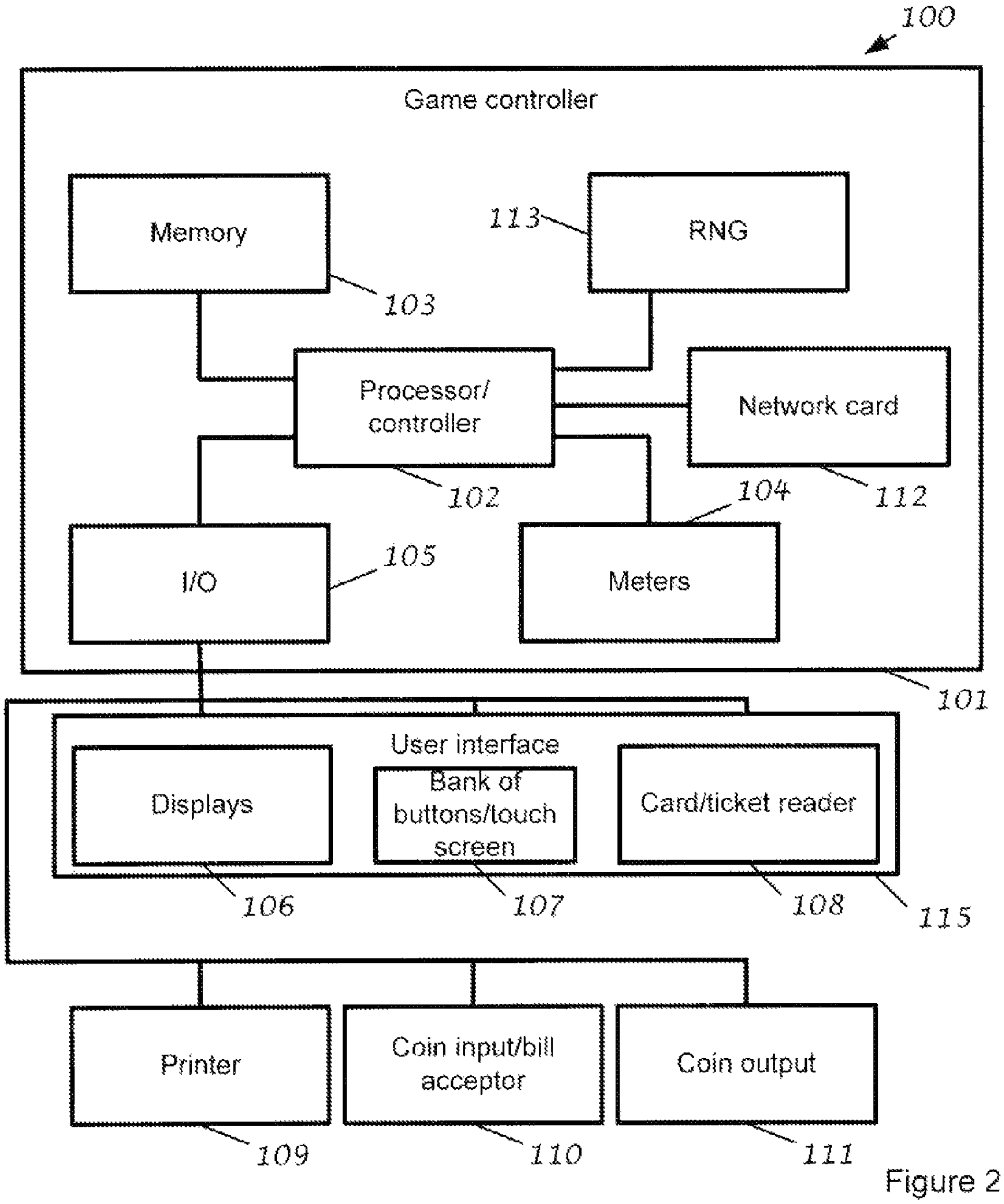
FIG. 2 shows a block diagram of gaming machine suitable for implementing the present invention.

FIG. 2 shows a block diagram of a gaming machine, generally referenced by arrow 100, suitable for implementing the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103. The instructions and data for controlling operation of the computational device 102 may be stored on a computer readable medium from which they are loaded into the gaming machine memory 103. The instructions and data may be conveyed to the gaming machine by means of a data signal in a transmission channel. Examples of such transmission channels include network connections, the Internet or an intranet and wireless communication channels.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted as required for the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may comprise a plurality of devices, which may be local or remote from each other. Instructions and data for controlling the operation of the user interface 115 may be conveyed to the user interface 115 by means of a data signal in a transmission channel. The user interface 115 may be a computational device, for example a personal computer, used by a person to play a game provided from a remote game controller 101.

Figure 3:
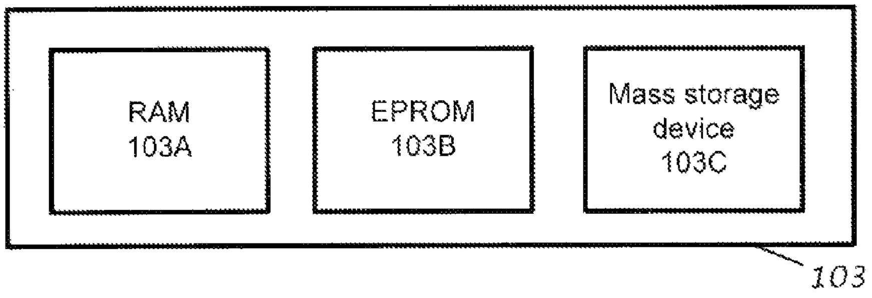
FIG. 3 shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
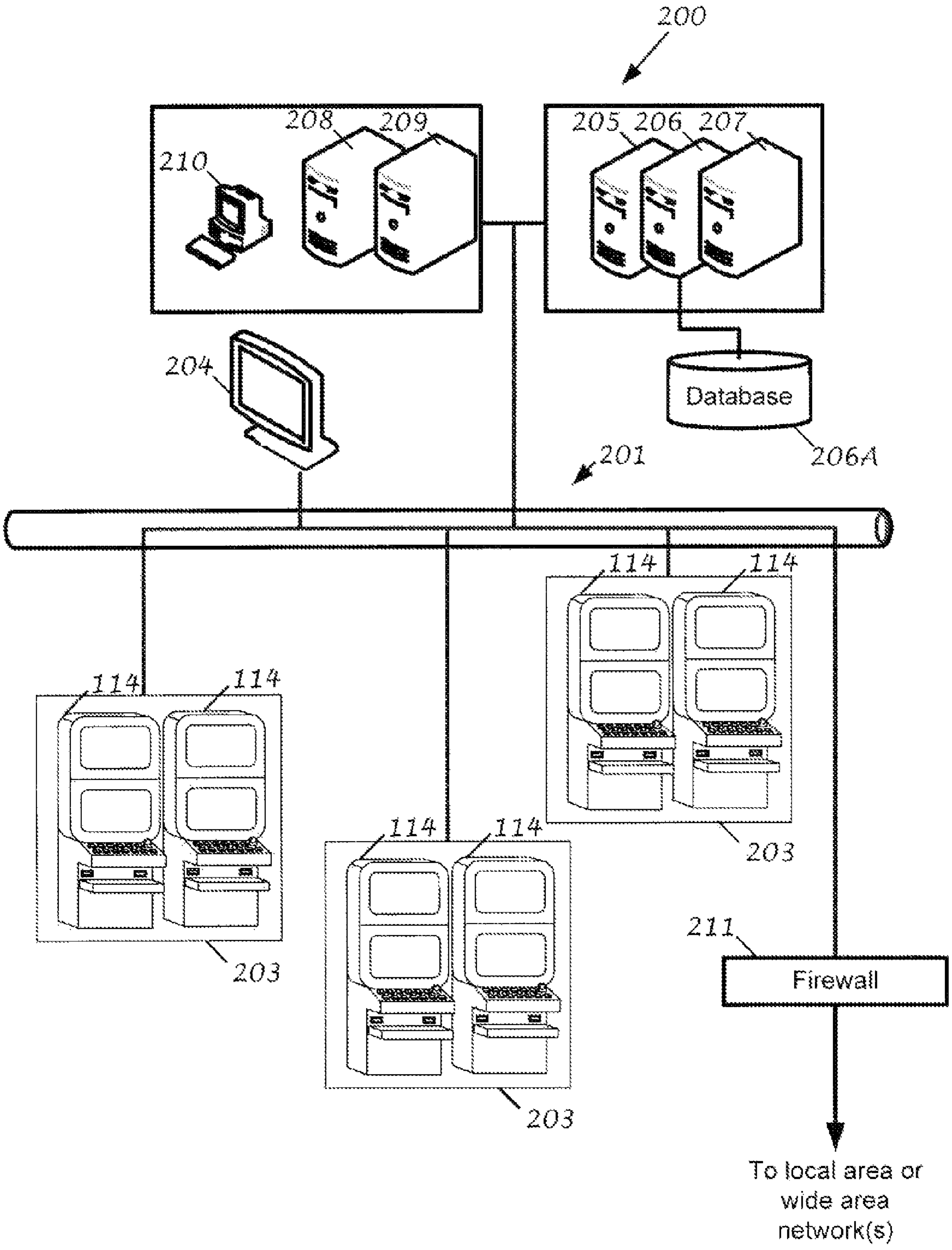
FIG. 4 shows diagrammatically, a network gaming system suitable for implementing the present invention.

FIG. 4 shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming consoles 114 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming consoles 114, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

The gaming system 200 may communicate with other gaming systems, other local networks, for example a corporate network and/or a wide area network such as the Internet through a firewall 211.

First and Second Games

The preferred embodiment of the invention will be described with reference to a first game and a second game. The preferred embodiment of the invention will also be described with reference to a spinning reel-type gaming machine, however the invention may, of course, be embodied in alternative game types. In a spinning reel type game the game controller 101 randomly selects a plurality of symbols from a group of symbols and displays the selected symbols in series columns (representing reels) on the display 106A or 106B. If a winning combination of symbols occurs the user of the gaming machine is awarded an award.

The first and second games may be made operative by the game controller 101 at any time during a users session with the game machine. The games may be restricted to users who satisfy one or more eligibility criteria, or may be made available to any user of the machine (i.e. the eligibility criteria is merely use of the machine).

For eligible users the first game may automatically be made operative by the controller 101 during standard game play or, alternatively, may only be made operative if an activation event occurs. While in the preferred embodiment the second game is automatically enabled by the game controller 101 on completion of the first game, the game controller 101 may of course be configured to only make the second game operative on the occurrence of an activation event.

The game controller 101 may be configured to recognise many different types of eligibility criteria and activation events. By way of non-limiting example, eligibility criteria and activation events may include one or a combination of two or more of the following:

- the selection of a game play option by the user;
- the display of a particular symbol during game play;
- the display of a particular symbol in a particular position during game play;
- the display of a combination of particular symbols during game play;
- the display of a combination of particular symbols in particular positions during game play;
- a user placing a wager of or above a certain amount;
- the cumulative total of a user's wager reaching a certain amount;
- the user being awarded a prize of or above a certain amount;
- the cumulative total of prizes awarded to a user reaching a certain amount;
- a user having spent a certain amount of time playing the gaming machine or a particular feature provided by the gaming machine;
- a user having played a certain number of games on the gaming machine;
- a random event;
- an event occurring on a linked gaming machine;
- an event counter (as described below) reaching a pre-determined value; and/or
- the occurrence of a particular player tracking event.

While the first and second games are described as distinct games it will be appreciated that the first and second games may be run simultaneously and/or in combination with other games. For example, the first game my be offered as part of general game play/a base game, in which case as well as maintaining the relevant event counters and recognising the relevant increment/decrement events the game controller 101 will also maintain all general game play functionality (e.g. recognition of winning combinations, bonus events etc). Alternatively, the first game may be offered as part of a feature game or be a feature game or base game in its own right.

First Game

While the first game is operative the game controller 101 is configured to recognise counter events that occur during game play and maintain an event counter. In this description counter events are described as either increment or decrement events according to whether the event results in the event counter being increased or decreased.

By way of example, game controller 101 may be configured such that:

- once activated, the first game remains operative for ten games (e.g. ten reel spins);
- the display of a "dog" symbol is an increment event; and
- the display of a "cat" symbol is a decrement event.

In this case, during the ten games while the first game is operative any dog that is displayed will result in the event counter being incremented and any cat that is displayed will result in the event counter being decremented. For example, if over the ten games eight dog symbols are displayed and two cat symbols are displayed the value of the event counter at the end of the first game will be six.

The length for which the first game is operative may, of course, be varied as desired and as is appropriate for the type of game in which the invention is embodied. For example, the game controller 101 may be configured to provide the first game until a first game deactivation event occurs. The first game deactivation event may, for example, be:

- completion of a particular number of games;
- lapsing of a particular amount of time;
- the wagering a certain amount;
- until the award of a certain amount; and/or
- the occurrence of one of the activation events as described above.

Similarly, the game controller 101 may be configured to recognise different increment and decrement events. By way of non-limiting example, increment/decrement events may be based on:

- the display of a particular symbol during game play;
- the display of a particular symbol in a particular position during game play;
- the display of a combination of particular symbols during game play; and/or
- the display of a combination of particular symbols in particular positions during game play.

Further, the game controller 101 may be configured such that different increment/decrement events result in different increment/decrement values being applied to the event counter. For example, the appearance of a small dog symbol may result in the game controller 101 incrementing the counter by one, while the appearance of a large dog symbol may result in the game controller 101 incrementing the counter by two. Similarly, the appearance of a small cat may result in the counter being decremented by one while the appearance of a large cat may result in the counter being decremented by two.

As an alternative example, the display of a particular symbol in one position may be interpreted as a different increment to the display of the same symbol in a different position. For example, a dog displayed on the first reel (where the game is a reel-type game) may result in an increment of one while the display of a dog on the second reel may result in an increment of two.

The increment/decrement value associated with a particular increment/decrement event may be linked to the wager placed by a user. For example, a dog appearing in a particular position may result in the event counter incrementing by the value of the wager placed by the user.

Different increment/decrement events may result in larger numbers being added to/subtracted from the event counter, or may even result in the value of the event counter being multiplied or divided by a certain number. In the preferred embodiment the game controller 101 is configured such that the event counter cannot be negative (i.e. any decrements to a zero value event counter are ignored), and that the event counter must be an integer (i.e. if the event counter is divided any non-integer result is rounded up or down).

The game controller 101 may also be configured to maintain multiple event counters, each event counter associated with one or more specific increment/decrement events. By way of example the game controller 101 may maintain an animal counter associated with the increment/decrement events described above (e.g. the display of dogs and cats). The game controller 101 may also maintain a card counter which operates in a similar fashion however has associated increment/decrement events responsive to card symbols being displayed (e.g. increment the card counter by one for a diamond symbol and by two for a heart symbol, decrement the card counter by one for a club symbol and by two for a spade symbol).

Where the game controller 101 maintains multiple event counters the game controller 101 may be further be configured to recognise generic increment and/or decrement events which serve to increment/decrement all counters being maintained by the game controller 101 (e.g. display of a particular symbol may result in all counters being incremented by five).

The number of event counters and/or the associated increment/decrement events may be held constant. Alternatively, the game controller 101 may be responsive to a particular event (such as an activation event as described above) to implement additional counters and associated increment/decrement events. For example, on satisfying the activation event for the first game the game controller 101 may automatically implement the animal event counter (as described above) but may offer the user the option to purchase (and thereby activate) the card event counter should they wish.

Second Game

Each event counter maintained by the game controller 101 in the first game is associated with one or more event counter effects. During game play with the second game operative the game controller 101 is configured to alter game play in accordance with the value(s) of the event counter(s) and the associated event counter effects.

As noted above, the first and second games may be run simultaneously. In the case that the first and second games are both operative the game controller 101 will continue to maintain any active event counters (but recognising increment/decrement events and updating the counters accordingly) during play with the second game operative.

Returning to the above example, the game controller 101 may, in one embodiment, be configured such that the animal event counter effect (i.e. the effect associated with the animal event counter) results in x specific symbols being displayed (x being the value of the animal event counter which, in the above example, was six).

The event counter effect may dictate, for example, that the game controller 101 displays the specific symbols in random positions on the display, or may be such that the game controller 101 displays the specific symbols in certain positions or regions on the display 106. For example, the game controller 101 may be configured to determine the position of the specific symbols in accordance with the symbols spun up. For example, the game controller 101 may be configured to prevent the specific symbols replacing the same type of symbol, or to target a type of symbol for the specific symbols to replace.

The event counter effect may also dictate when the specific symbols are displayed. For example, the specific symbols may be displayed:

- randomly;
- in each game played whilst the second game is operative;
- at a defined point in the duration of the second game (e.g. at the end);
- at the specific instruction of the user;
- on the occurrence of one or more of the activation events as described above.

The specific symbols displayed may replace existing symbols or may be additional symbols that are additional to the existing symbols. Additional symbols may be achieved, for example, by making the specific symbols transparent and overlaying the existing symbols with the specific symbols. In this case the game controller 101 determines winning combinations and awards on the basis of both the existing symbol and the transparent specific symbol being displayed in that location.

In an alternative embodiment, the game controller 101 may be configured to replace x symbols from the group of symbols (recalling that the symbols to be displayed are randomly selected from the group of symbols) with x specific symbols, thereby increasing the probability of a specific symbol being displayed during play of the second game. As a further alternative the game controller 101 may be configured to add x specific symbols to the group of symbols.

The specific symbols displayed as a result of the event counter (or replaced/added to the group of symbols) may be symbols which are already in the group of symbols, or may be alternative symbols with their own special functionality. For example, one or more of the specific symbols may be a wild symbol.

As with the first game, the game controller 101 may be configured to keep the second game operative until a second game deactivation event occurs. A deactivation event may, for example, be one or more of the activation events described above. On termination of the second game the game controller 101 returns the group of symbols to their "normal" game play state (i.e. stops altering game play in accordance with the event counters and event counter effects).

Example of Game Play

Figure 5:
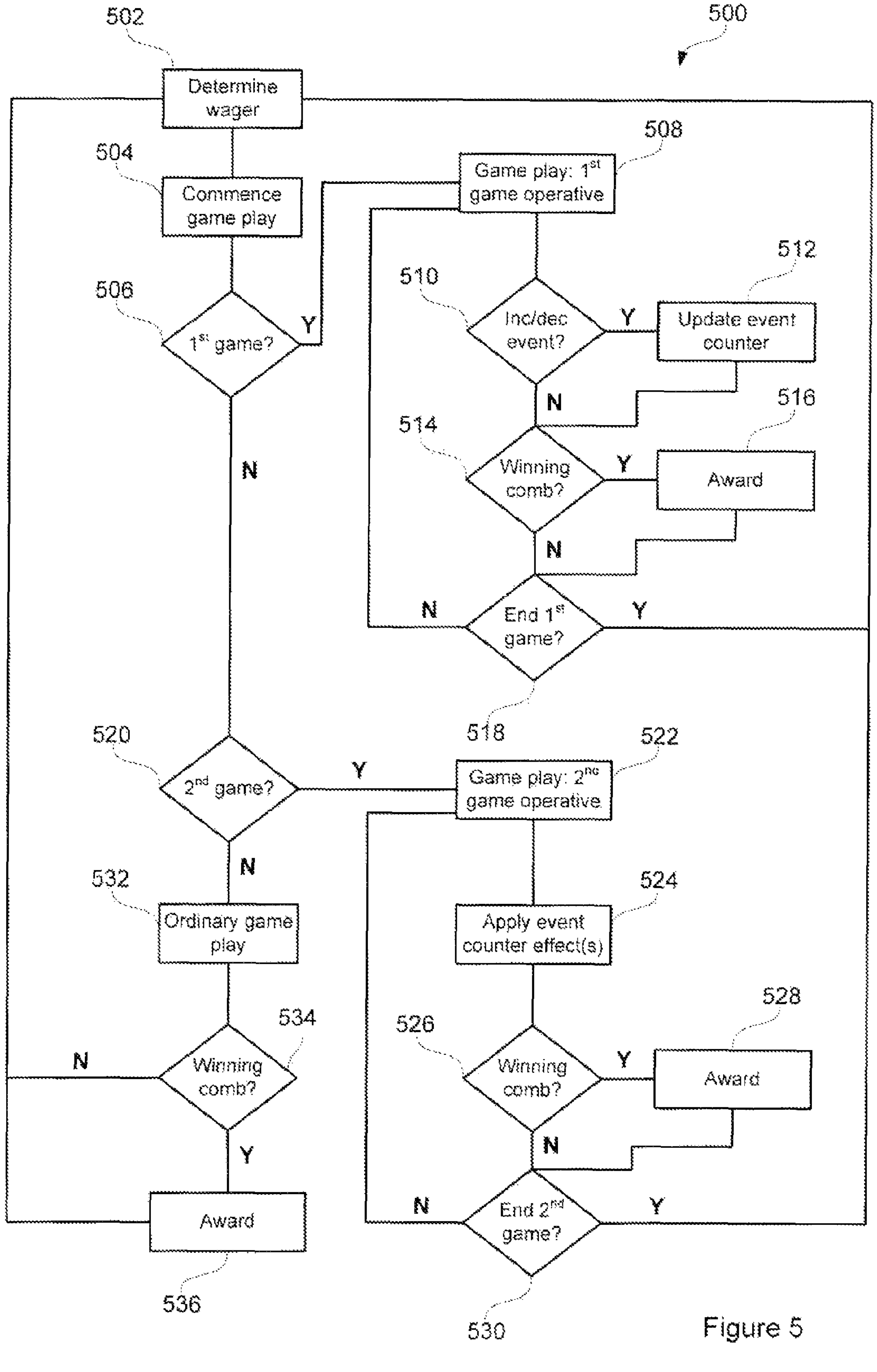
FIG. 5 shows a flow diagram of a process performed in accordance with an embodiment of the present invention.

FIG. 5 shows a process flow diagram of a process 500 performed in accordance with an embodiment of the present invention. It will be appreciated that the invention may be realised by alternative processes and/or with alternative steps to those specifically described below.

The process may be performed by the gaming system 200, in which the gaming consoles 114 each include game controllers 101 to form gaming machines 100 and the following description assumes this implementation. However, those skilled in the relevant arts will appreciate that the process will also be able to be implemented by other gaming systems.

In step 502, the game controller 101 monitors the bill acceptor and/or coin input 110 and/or information received by the card/ticket reader 108 or network card 112 for a deposit of credit and in response causes the hardware meters 104 to increment according to the denomination of the game. The game controller 101 then monitors the user interface 107 for the input of a wager.

If there are sufficient credits in the meters 104 to support the wager, game play is commenced in step 504 by the game controller 101.

In step 506 the game controller 101 determines whether a first game activation event has occurred. If a first game activation event has occurred, the game controller 101 provides for game play with the first game operative (step 508).

After each game play with the first game operative the game controller 101 determines whether an increment and/or decrement event has occurred (step 510) and, if so, updates the event counter accordingly (step 512). Depending on the embodiment of the invention, the game controller 101 may also determine whether a winning combination has occurred (step 514) and, if so, award the user with the relevant award (step 516). The game controller 101 then determines whether the first game should remain operative (step 518) and, if so, returns to step 508.

If the game controller 101 determines that the first game is to end (e.g. due to the occurrence of a particular event) the game controller 101 returns to step 502.

If at step 506 a first game activation event has not occurred, the game controller 101 then determines whether a second game activation event has occurred (step 520).

If a second game activation event has occurred the game controller 101 provides for game play with the second game operative (step 522). At each game play with the second game operative the game controller 101 implements the event counter effects (step 524) as required by (and in accordance with the value of) any event counters with non-zero values. In step 526 the game controller 101 then determines whether a winning combination has occurred and, if so, awards the user with the associated award (step 528).

The game controller 101 then determines whether the second game should remain operative (step 530) and, if so, returns to step 520 (game play with the second game operative).

If the game controller 101 determines that the second game is to end (e.g. due to the occurrence of a particular event) the game controller 101 returns to step 502.

If neither a first game activation event has occurred (evaluated at step 506) nor a second game activation event has occurred (evaluated at step 520) the game controller 101 provides the user with an "ordinary" game play in step 532. At step 534 the game controller determines whether a winning combination has occurred and, if so, awards the user with the associated award (step 536) before returning to step 502.

As noted above, "ordinary" game, game play with the first game operative, and/or game play with the second game operative may in fact be identical with the exception that in "ordinary" game play the game controller 101 will not recognise increment/decrement events and/or event counter effects.

With regard to steps 506 and 520 (in which the game controller 101 determines whether a first or second game activation event has occurred), activation events may occur in any of game play with the first game operative (step 508), game play with the second game operative (step 522), or ordinary game play (step 532). If desired activation events may be monitored by use of appropriate flags, for example by setting a first game activation event flag to "true" on occurrence of a first game activation event and setting a second game activation event flag to "true" on occurrence of a second game activation event (and resetting the flags to "false" as appropriate—e.g. immediately prior to step 508 for the first game flag and just prior to step 522 for the second game flag). In this case steps 506 and 520 merely involve the game controller 101 checking the value of the relevant flag.

While the foregoing description has been provided by way of example of the preferred embodiments of the present invention as presently contemplated, which utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A gaming machine that provides games in which a plurality of symbols are selected from a group of symbols and displayed on a display and, if a winning combination occurs, the gaming machine awards an award, the gaming machine comprising a user interface in communication with a game controller, the game controller being configured to:

provide a first game, maintain an event counter, and modify said event counter each time a counter event occurs during the first game;

provide a second game, modify the group of symbols to include a number of specific symbols, the number of specific symbols being dependent on the value of the event counter; and wherein the game controller is configured to maintain a second event counter and modify the second event counter each time a second counter event occurs during the first game; and wherein the game controller is configured to modify the group of symbols to include a number of second specific symbols, the number of second specific symbols being dependent on the value of the second event counter.

2. A gaming machine according to claim 1, wherein the counter event may be an increment event resulting in the game controller modifying the event counter by incrementing the event counter, or the counter event may be a decrement event resulting in the game controller modifying the event counter by decrementing the event counter.

3. A gaming machine according to claim 1, wherein the group of symbols is modified by the game controller by adding the number of specific symbols to the group of symbols.

4. A gaming machine according to claim 1, wherein the group of symbols is modified by the game controller by replacing existing symbols in the group of symbols with the number of specific symbols.

5. A gaming machine according to claim 1, wherein the counter event is selected from a group including:

the display of a particular symbol on the display;

the display of a particular symbol in a particular position on the display;

the display of a plurality of particular symbols on the display; or the display of a plurality of particular symbols in particular positions on the display.

6. A gaming machine according to claim 1, wherein different counter events result in the event counter being modified by a different value.

7. A gaming machine according to claim 1, wherein during the second game the game controller is configured to display each specific symbol on the display.

8. A gaming machine according to claim 1, wherein during the second game the game controller is configured to display each specific symbol on the display in a pre-determined position.

9. A gaming machine according to claim 1, wherein the first game is activated by a first game activation event.

10. A gaming machine according to claim 1, wherein the second game is activated by a second game activation event.

11. A gaming machine according to claim 10, wherein the game controller is further configured to execute instructions.

12. A gaming machine according to claim 11, further comprising a storage medium readable by the game controller, the storage medium storing said instructions.

13. A gaming machine according to claim 1, wherein the first game is deactivated by a first game deactivation event.

14. A gaming machine according to claim 1, wherein the second game is deactivated by a second game deactivation event.

15. A method for use with a gaming machine that is arranged to provide games in which symbols from a group of symbols are selected and displayed on a display, and to award an award if a winning outcome occurs, the method comprising:

providing a first game, maintaining an event counter, and modifying said event counter each time a counter event occurs;

providing a second game, and modifying the group of symbols to include a number of specific symbols, the number of specific symbols being dependent on the value of the event counter;

maintaining a second event counter;

modifying said second event counter each time a second counter event occurs during the first game;

modifying the group of symbols to include a number of second specific symbols, the number of second specific symbols being dependent on the value of the second event counter.

16. A method according to claim 15, wherein the counter event may be an increment event resulting in the event counter being modified by being incremented, or the counter event may be a decrement event resulting in the event counter being modified by being decremented.

17. A method according to claim 15, wherein the group of symbols is modified by adding the number of specific symbols to the group of symbols.

18. A method according to claim 16, wherein the group of symbols is modified by replacing existing symbols in the group of symbols with the number of specific symbols.

19. A method according to claim 15, wherein the counter event is selected from a group including:

the display of a particular symbol on the display;

the display of a particular symbol in a particular position on the display;

the display of a plurality of particular symbols on the display; or the display of a plurality of particular symbols in particular positions on the display.

20. A method according to claim 15, wherein different counter events result in the event counter being modified by a different value.

21. A method according to claim 15, wherein during the second game each specific symbol is displayed on the display.

22. A method according to claim 15, wherein during the second game each specific symbol is displayed on the display in a pre-determined position.

23. A method according to claim 15, wherein the first game is activated by a first game activation event.

24. A method according to claim 15, wherein the second game is activated by a second game activation event.

25. A method according to claim 15, wherein the first game is deactivated by a first game deactivation event.

26. A method according to claim 15, wherein the second game is deactivated by a second game deactivation event.

27. A method according to claim 15, further comprising transmitting a data signal carrying instructions and/or data executable to implement said method.

* * * * *